United States Patent
Lee et al.

(10) Patent No.: US 8,704,883 B2
(45) Date of Patent: Apr. 22, 2014

(54) 3D IMAGE DISPLAY DEVICE AND DRIVING METHOD THEREOF

(75) Inventors: Jeongki Lee, Paju-si (KR); Joonyoung Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 514 days.

(21) Appl. No.: 12/961,072

(22) Filed: Dec. 6, 2010

(65) Prior Publication Data

US 2012/0086706 A1  Apr. 12, 2012

(30) Foreign Application Priority Data

Oct. 12, 2010 (KR) ............ 10-2010-0099251

(51) Int. Cl.
- H04N 9/47 (2006.01)
- H04N 13/04 (2006.01)
- H04N 13/00 (2006.01)
- H04N 15/00 (2006.01)

(52) U.S. Cl.
USPC .......... 348/56; 348/42; 348/43; 348/46; 348/51

(58) Field of Classification Search
USPC ................................... 348/42–60
See application file for complete search history.

(56) References Cited

U.S. PATENT DOCUMENTS

| | | | |
|---|---|---|---|
| 2006/0022973 A1* | 2/2006 | Alcorn et al. | 345/419 |
| 2008/0170274 A1 | 7/2008 | Lee | |
| 2008/0291326 A1* | 11/2008 | Shishido et al. | 348/555 |
| 2009/0080789 A1 | 3/2009 | Shoji | |
| 2010/0033555 A1 | 2/2010 | Nagase et al. | |
| 2010/0231698 A1 | 9/2010 | Nakahata et al. | |
| 2010/0238274 A1 | 9/2010 | Kim et al. | |
| 2011/0222559 A1 | 9/2011 | Ishii et al. | |

FOREIGN PATENT DOCUMENTS

| | | |
|---|---|---|
| CN | 101165548 A | 4/2008 |
| CN | 101222648 A | 7/2008 |
| CN | 101409051 A | 4/2009 |
| CN | 101697595 A | 4/2010 |
| CN | 101782687 A | 7/2010 |
| JP | 2009-25436 A | 2/2009 |
| JP | 2009-58785 A | 3/2009 |
| JP | 2010-217311 A | 9/2010 |
| WO | WO 2010/064557 A1 | 6/2010 |

* cited by examiner

*Primary Examiner* — Joseph Ustaris
*Assistant Examiner* — Farhan Mahmud
(74) *Attorney, Agent, or Firm* — Birch, Stewart, Kolasch & Birch, LLP

(57) ABSTRACT

A method of driving a 3D image display device includes according to an embodiment receiving 3D data and separating a 3D input frame including the 3D data into a left-eye data frame and a right-eye data frame; doubling the left-eye data frame into the original left-eye data frame and a copied left-eye data frame and doubling the right-eye data frame into the original right-eye data frame and a copied right-eye data frame; and modulating the original left-eye data frame to a first modulated left-eye data frame based on the copied right-eye data frame arranged prior to the original left-eye data frame, modulating the copied left-eye data frame, and the copied right-eye data frame.

12 Claims, 7 Drawing Sheets

(A) original data stream (B) data stream to which ODC is applied (A) 180 - 0 - 150

| Frame | 1F | 2F | 3F | 4F | 5F | 6F | 7F | 8F | |
|---|---|---|---|---|---|---|---|---|---|
| BDI | L' | B | R' | B | L' | B | R' | B | |
| Polarity change by frames | + | − | + | − | + | − | + | − | 1 Frame Inversion |
| | + | + | − | − | + | + | − | − | 2 Frame Inversion |
| | + | + | + | + | − | − | − | − | 4 Frame Inversion |

…

3D IMAGE DISPLAY DEVICE AND DRIVING METHOD THEREOF

This application claims the priority benefit of Korean Patent Application No. 10-2010-0099251 filed on Oct. 12, 2010, which is incorporated herein by reference for all purposes as if fully set forth herein.

BACKGROUND

1. Field

This document relates to a 3D image display device and a driving method thereof for improving picture quality.

2. Related Art

With the advancement of various image processing techniques, 3D image display systems capable of displaying 3D images are developed.

Methods of generating 3D images are divided into a stereoscopic technique and an autostereoscopic technique.

The stereoscopic technique uses disparity images of left and right eyes, which have high 3D effect, and includes a stereoscopic method and an autostereoscopic method which are practically used. The autostereoscopic method provides an optical plate such as a parallax barrier for separating optical axes of left and right disparity images from each other before or behind a display screen. The stereoscopic method displays left and right disparity images having different polarization directions on a liquid crystal display panel and generates 3D images by using polarizing glasses or liquid crystal shutter glasses.

The stereoscopic method is divided into a first polarizing filter method using a pattern retarder film and polarizing glasses, a second polarizing filter method using a switching liquid crystal layer and polarizing glasses, and a liquid crystal shutter glasses method. In the first and second polarizing filter methods, 3D images have low transmissivity due to the pattern retarder film or the switching liquid crystal layer, which is arranged on a liquid crystal display panel to function as a polarizing filter.

The liquid crystal shutter glasses method alternately displays left-eye and right-eye images on a display frame by frame and opens/closes left-eye and right-eye shutters of liquid crystal shutter glasses in synchronization with the display timing to generate a 3D image. The liquid crystal shutter glasses open only the left-eye shutter for an nth frame period in which a left-eye image is displayed and open only the right-eye shutter for an (n+1)th frame period in which a right-eye image is displayed to generate binocular disparity in a time division manner.

In 3D image display devices, a liquid crystal display (LCD) is widely used as an image display device. The LCD, a hold type display device, holds data charged in a previous frame right before new data is written because of maintenance characteristic of liquid crystal. The response of liquid crystal is delayed according to data writing. The response delay of liquid crystal causes motion blurring when a left-eye image is changed to a right-eye image or when a right-eye image is changed to a left-eye image while the LCD generates a 3D image to result in 3D crosstalk in the form of a ghost.

Various methods for improving the response characteristic of liquid crystal for 2D images are known. Over driving control (ODC) modulation compares previous frame data and current frame data to each other, detects a data variation according to the comparison result, reads a compensation value corresponding to the data variation from a memory and modulates input data with the read compensation value. Referring to FIG. 1, the ODC modulation method modulates the current frame data into "223" larger than "191" when the previous frame data is "127" and the current frame data is "191" and modulates the current frame data into "31" smaller than "63" when the previous frame data is "191" and the current frame data is "63" so as to improve the response characteristic of liquid crystal.

Black data insertion (BDI) method is a method for improving the response characteristic of liquid crystal by inserting a black frame between neighboring frames, thereby improve motion blurring.

To improve the 3D crosstalk, it is considered to apply the above-described methods for improving the response characteristic of liquid crystal to 3D image display devices, as shown in FIG. 2. In FIG. 2, an (n−2)th frame Fn−2 represents a left-eye data frame displaying a left-eye image, an nth frame Fn represents a right-eye data frame displaying a right-eye image, and an (n−1)th frame Fn−1 denotes a black frame displaying a black image.

However, when the BDI is applied to 3D images, a frame right before the left-eye data frame or the right-eye data frame is a black frame all the time, and thus 3D crosstalk cannot be effectively improved with conventional ODC logic and compensation values. For example, the (n−2)th frame Fn−2 and the nth frame Fn respectively corresponding to the left-eye and right-eye data frames are arranged having the (n−1)th frame Fn−1 corresponding to a black frame between them and the conventional ODC modulation method is applied to the frames, the display luminance corresponding to the nth frame Fn (having a target gray-scale value "150") in a case A where a target gray-scale value is changed in the order of "180", "0" and "150" by frames becomes different from the display luminance corresponding to the nth frame Fn in a case B where the target gray-scale value is changed in the order of "255", "0" and "150" by frames. In both the cases A and B, the nth frame Fn has the same ODC value "180" in response to a variation in the target gray-scale value from "0" to "150". However, if a time required for a display image to be changed from a specific gray-scale level to the perfect black level becomes longer than one frame due to a response time delay of liquid crystal, a right-eye (or left-eye) image is displayed in the state that the display image does not become a perfect black image. Since initial luminance Di corresponding to a rising time of liquid crystal for displaying the right-eye image in the nth frame Fn is proportional to a gray-scale difference between the (n−2)th frame Fn−2 and the (n−1)th frame Fn−1, the initial luminance Di in the case B is higher than that in the case A.

Accordingly, to remove a luminance variation, it is required to ODC-modulate data of the right-eye (or left-eye) data frame with reference to the gray-scale value of the left-eye (or right-eye) data frame. However, a black frame is inserted between neighboring data frames and then ODC modulation is performed at present, and thus it is impossible to ODC-modulate the data of the right-eye data frame with reference to the gray-scale value of the left-eye data frame.

SUMMARY

An aspect of this document is to provide a 3D image display device and a driving method thereof for removing 3D crosstalk without causing a luminance variation.

In an aspect, a method of driving a 3D image display device comprises receiving 3D data frame and separating a 3D input frame including the 3D data frame into a left-eye data frame and a right-eye data frame; doubling the left-eye data frame into the original left-eye data frame and a copied left-eye data frame and doubling the right-eye data frame into the original right-eye data frame and a copied right-eye data frame; modulating the original left-eye data frame to a firstfirst modulated left-eye data frame based on the copied right-eye data frame arranged prior to the original left-eye data frame, modulating the copied left-eye data frame to a secondsecond modulated left-eye data frame based on the original left-eye data frame arranged prior to the copied left-eye data frame, modulating the original right-eye data frame to a firstfirst modulated right-eye data frame based on the copied left-eye data frame arranged prior to the original right-eye data frame, and modulating the copied right-eye data frame to a secondsecond modulated right-eye data frame based on the original right-eye data frame arranged prior to the copied right-eye data frame; substituting the secondsecond modulated left-eye data frame and the secondsecond modulated right-eye data frame with black frames; and displaying data of final modulated frames consisting of the first modulated left-eye data frame, the first modulated right-eye data frame and the black frames determined through the modulation and substitution on a display panel.

BRIEF DESCRIPTION OF THE DRAWINGS

The implementation of this document will be described in detail with reference to the following drawings in which like numerals refer to like elements.

FIG. 11 illustrates an example of controlling data polarity according to a 4-frame inversion method.

DETAILED DESCRIPTION

Hereinafter, implementations of this document will be described in detail with reference to FIGS. 3 through 12.

Figure 1:
FIG. 1 is a diagram for explaining a conventional ODC modulation method.
Figure 1:
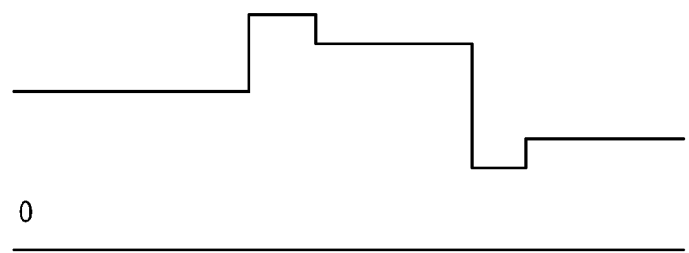
Figure 2:
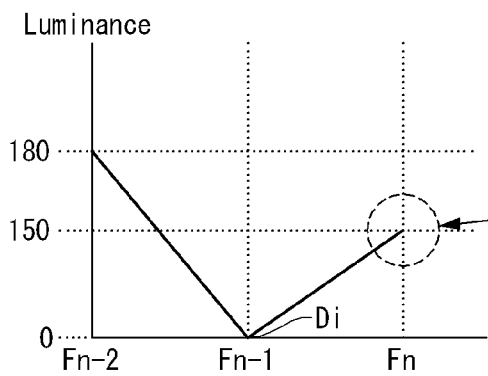
FIG. 2 are graphs showing a luminance variation generated when a 3D image is displayed according to a conventional technique.
Figure 2:
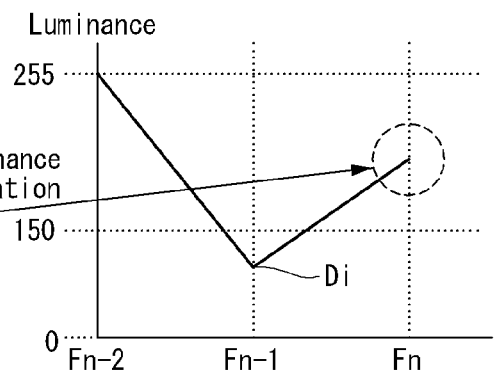
Figure 3:
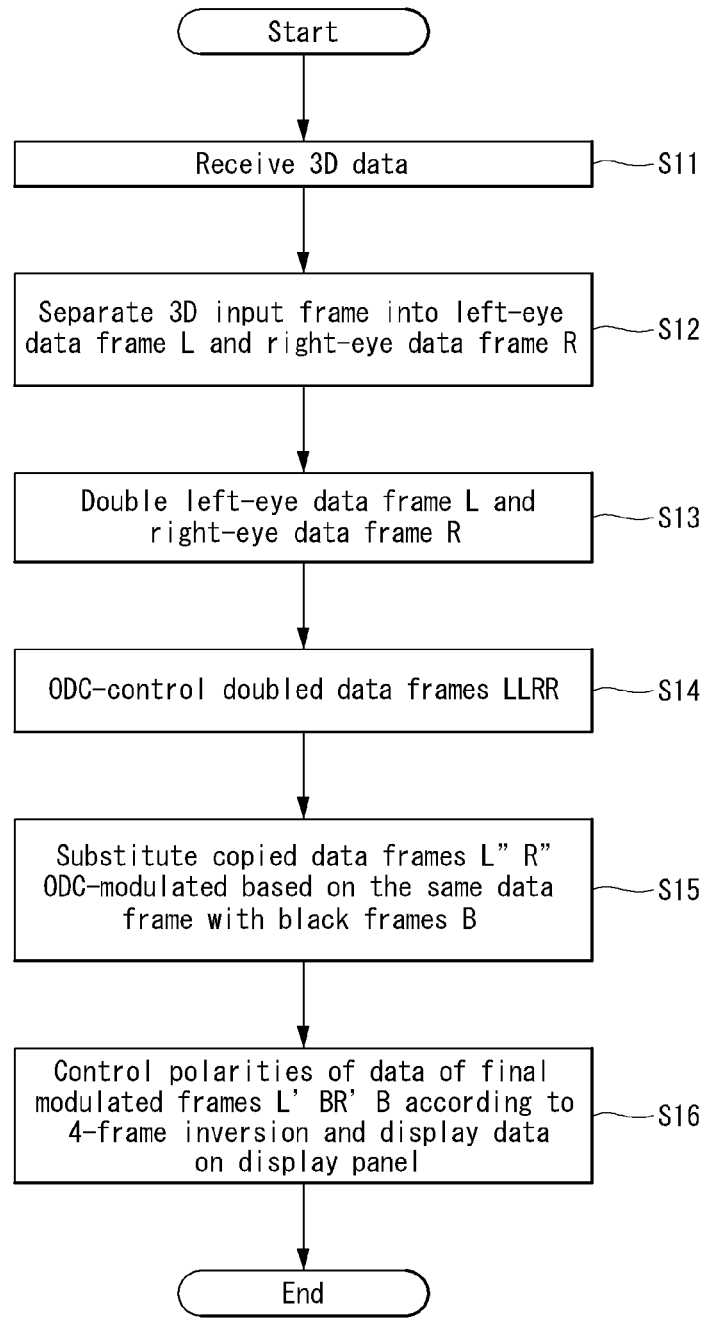
FIG. 3 is a flowchart illustrating an implementation of a method of driving a 3D image display device according to this document.

FIG. 3 is a flowchart illustrating an implementation of a method of driving a 3D image display device according to this document.

Figure 4A:
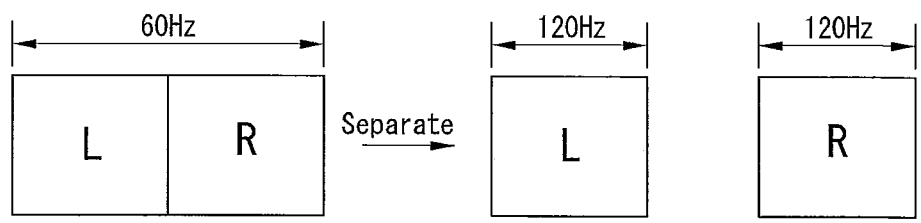
FIGS. 4A and 4B illustrate exemplary operations of separating a 3D input frame into a left-eye data frame and a right-eye data frame.
Figure 4B:
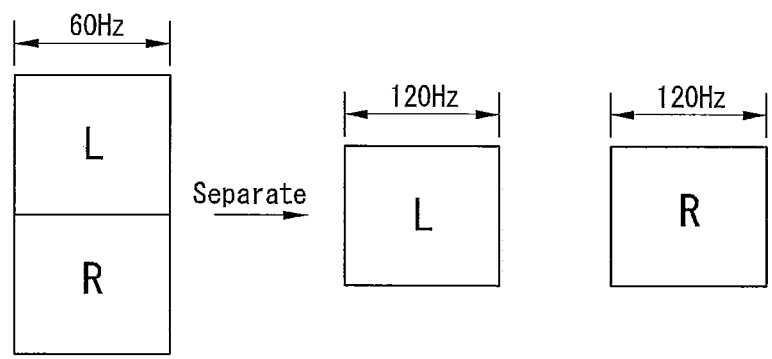

Referring to FIG. 3, when a 3D data frame is inputted from an external video source (not shown) in operation S11, the 3D data frame is separated into a left-eye data frame L and a right-eye data frame R, as shown in FIGS. 4A and 4B, in operation S12. FIG. 4A illustrates separation of a side-by-side type input 3D data frame into a left-eye data frame L and a right-eye data frame R and FIG. 4B illustrates separation of a top-and-bottom type input 3D data frame into a left-eye data frame L and a right-eye data frame R. An input frame frequency (for example, 60 Hz) is multiplied by two and display timings of the left-eye data frame L and the right-eye data frame R are synchronized with the multiplied frame frequency (for example, 120 Hz).

Figures 5, 6:
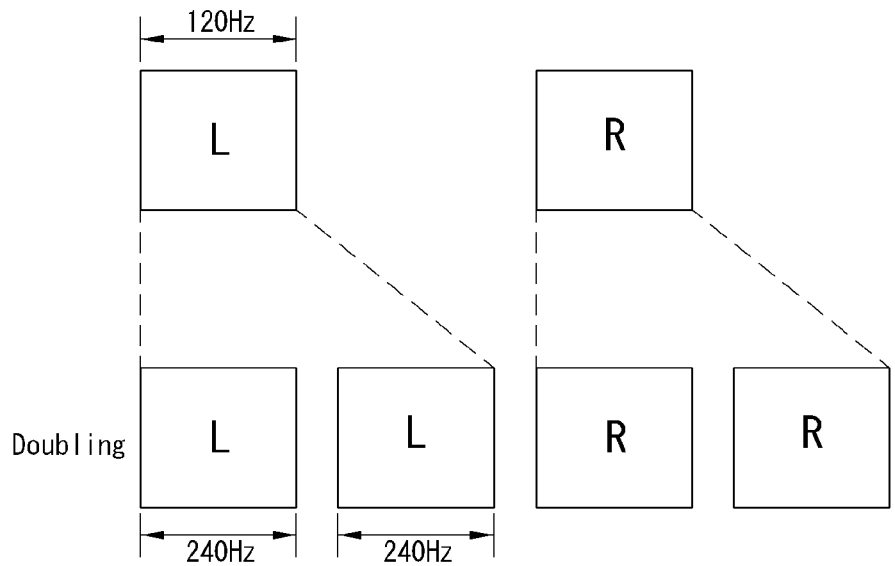
FIG. 5 illustrates an operation of doubling the left-eye data frame and the right-eye data frame.
FIG. 6 illustrates an exemplary look-up table according to this document.

The left-eye data frame L and the right-eye data frame R are doubled through a data copying operation using a memory, as shown in FIG. 5, in operation S13. Here, the multiplied frame frequency (for example, 120 Hz) in operation is further multiplied by two and display timings of the doubled data frames LLRR are synchronized with the further multiplied frame frequency (for example, 240 Hz). The doubled data frames LLRR include the original left-eye data frame L, a copied left-eye data frame L, the original right-eye data frame R, and a copied right-eye data frame R. A flag bit is generated as a first logic in synchronization with the display timings of the original data frames L and R. In addition, the flag bit is generated as a second logic in synchronization with the display timings of the copied data frames LR.

The doubled data frames LLRR are ODC-modulated with reference to a look-up table as shown in FIG. 6 in operation S14. The ODC modulation compares data of a previous frame Fn−1 with data of a current frame Fn, as shown in FIG. 6, detects a variation between the data of the previous frame Fn−1 and the data of the current frame Fn, reads a compensation value (ODC value) corresponding to the detection result from the look-up table and modulates the data of the current frame Fn with the read compensation value.

Figure 7:
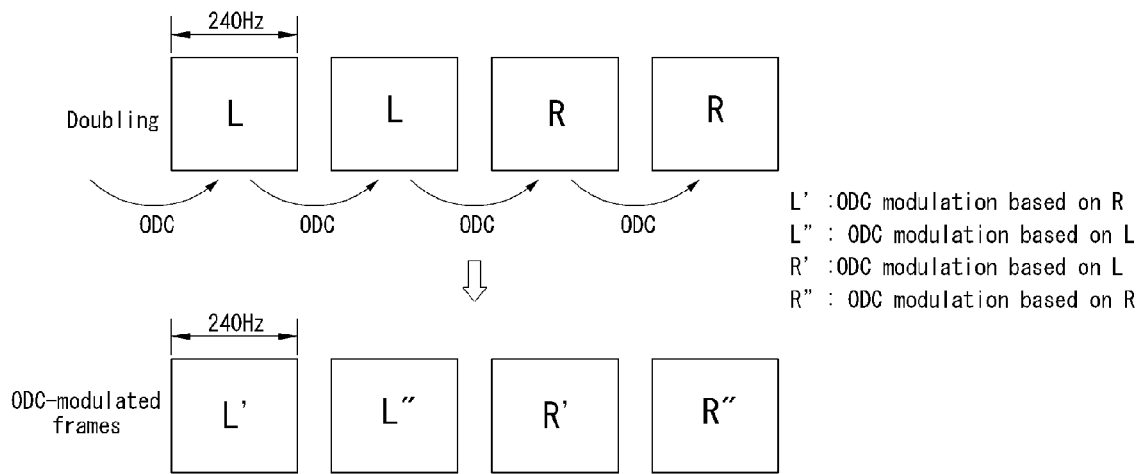
FIG. 7 illustrates an exemplary operation of ODC-modulating doubled data frames.

As shown in FIG. 7, the original left-eye data frame L is modulated to a first modulated left-eye data frame L' based on the copied right-eye data frame R arranged prior to the original left-eye data frame L and the copied left-eye data frame L is modulated to a second modulated left-eye data frame L" based on the original left-eye data frame L arranged prior to the copied left-eye data frame L according to the ODC modulation. In addition, as is also shown in FIG. 7, the original right-eye data frame R is modulated to a first modulated right-eye data frame R' based on the copied left-eye data frame L arranged prior to the original right-eye data frame R and the copied right-eye data frame R is modulated to a second modulated right-eye data frame R" based on the original right-eye data frame R arranged prior to the copied right-eye data frame R according to the ODC modulation.

Figure 8:
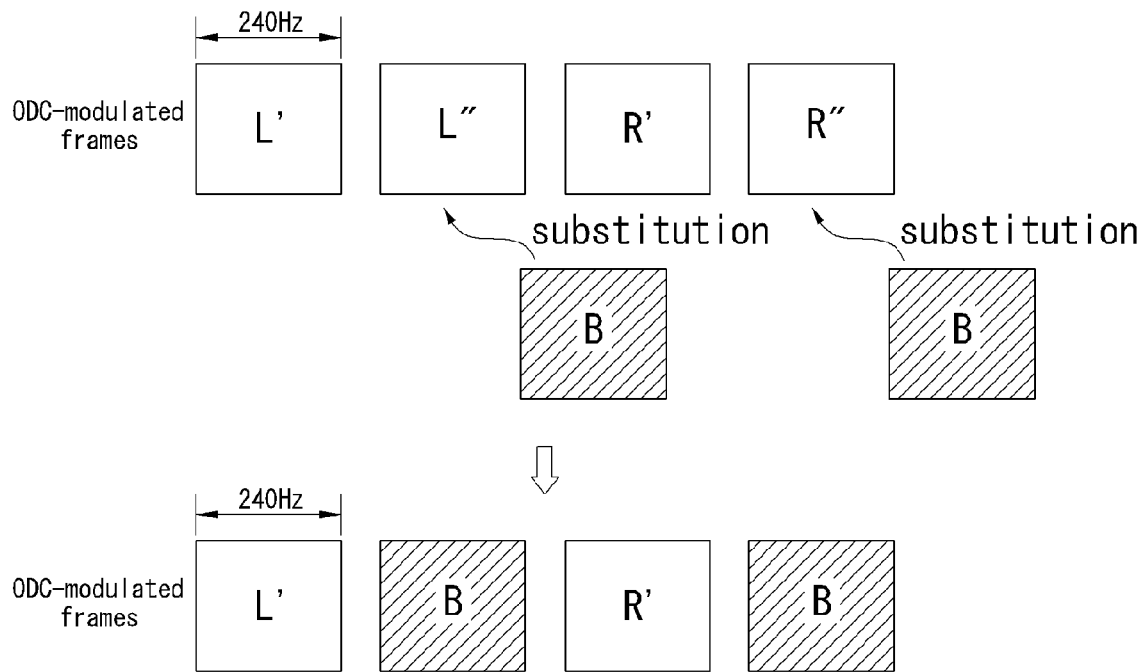
FIG. 8 illustrates an exemplary operation of substituting copied data frames ODC-modulated based on the same data frame with black frames.

Then, in operation S15, the ODC-modulated original data frames, that is, the first modulated left-eye data frame L' and the first modulated right-eye data frame R', are selected according to the first logic of the flag bit, and the ODC-modulated copied data frames, that is, the second modulated left-eye data frame L" and the second modulated right-eye data frame R", are substituted with black frames B according to the second logic of the flag bit to generate final modulated frames L'BR'B, as shown in FIG. 8, in operation S15.

The polarities of the data of the final modulated frames L'BR'B are inverted according to a 4-frame inversion method and the data are displayed on a display panel in operation S16.

Figure 9:
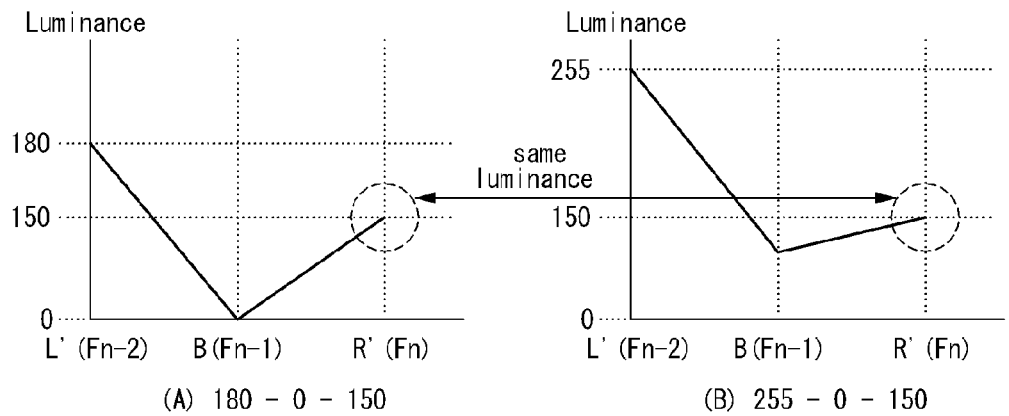
FIG. 9 is a diagram for explaining the effect of an implementation of this document.

FIG. 9 shows the effect of the implementation of this document.

Referring to FIG. 9, when an (n−2)th frame Fn−2 and an nth frame Fn respectively corresponding to left-eye and right-eye data frames are arranged having an (n−1)th frame Fn−1 corresponding to a black data frame between them, the luminance of the nth frame Fn reaches "150" in both a case A in which a target luminance value is changed in the order of "180", "0" and "150" by frames and a case B in which the target luminance value is changed in the order of "255", "0" and "150" by frames.

A luminance variation in the nth frame Fn is removed because the original right-eye data of the nth frame Fn is ODC-modulated based on the copied left-eye data of the (n−1)th frame.

In a prior art, ODC modulation was performed after a black frame is inserted. Accordingly, with respect to the case (A) and case (B), the nth frame Fn should have the same ODC value in response to the same variation in the target gray-scale value from "0" to "150" between the (n−1)th frame Fn−1 and the nth frame Fn. However, in case (B) in which the target gray-scale value of the (n−2)th frame Fn−2 is "255", since the black gray-scale value in the (n−1)th frame Fn−1 becomes a value higher than "0", due to a response time delay of liquid crystal, the case (B) has a black luminance higher than that of the case A during the nth frame Fn. As a result, a luminance variation is generated in the cases (A) and (B) when the nth frame Fn is applied the same ODC value according to the conventional ODC modulation method.

On the other hand, in an implementation of this document, the left-eye and right-eye image data frames are doubled and ODC-modulated before substitution of black frames. Specifically, with respect to FIG. 9, after the doubling operation (S13), the doubled data frames LLRR include the original left-eye data frame L (Fn−2), the copied left-eye data frame L (Fn−1), the original right-eye data frame R (Fn), and the copied right-eye data frame R (Fn+1). Then, in the ODC-modulation operation (S14), a first ODC value is set for the original right-eye data frame R (Fn) in response to a variation in the target gray-scale value from "180" to "150" between the copied left-eye data frame L (Fn−1) and the original right-eye data frame R (Fn) in the case A, and a second ODC value is set for the original right-eye data frame R (Fn) in response to a variation in the target gray-scale value from "255" to "150" between the copied left-eye data frame L (Fn−1) and the original right-eye data frame R (Fn) in the case B, resulting in ODC-modulated left-eye data frames L'(Fn−2), L"(Fn−1), and ODC-modulated right-eye data frames R'(Fn) and R"(Fn+1). Then, in the substitution operation (S15), the ODC-modulated left-eye data frame L"(Fn−1) is substituted with a black frame B (Fn−1) in both the cases A and B. Here, R"(Fn+1) is also substituted by a black frame B, but is not discussed here with respect to FIG. 9. Accordingly, in the present invention, both the first ODC value in the case (A) and the second ODC value in the case (B) are set for the right-eye data frame with reference to the gray-scale value of the previous left-eye data frame, and thus may be set as values capable of removing the luminance variation between the cases A and B. In addition, it can be easily estimated from FIG. 6 that the second ODC value in the case B can be set as a value smaller than the first ODC value in the case A.

Figure 10:
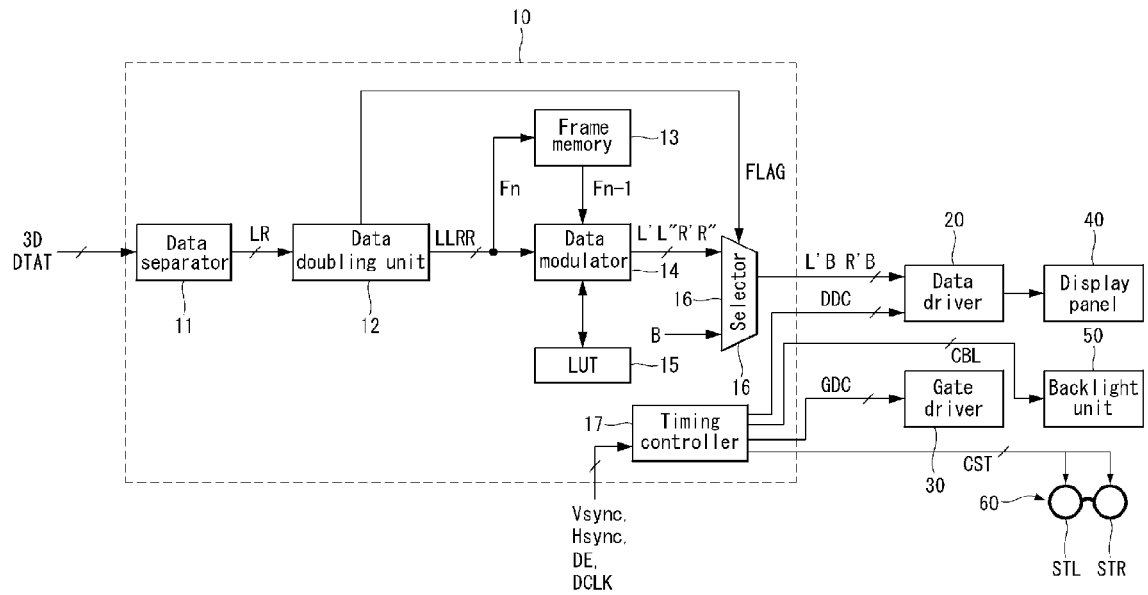
FIG. 10 is a block diagram of an implementation of a 3D image display device according to this document.

FIG. 10 is a block diagram of an implementation of a 3D image display device according to this document.

Referring to FIG. 10, the 3D image display device includes a control circuit 10, a data driver 20, a gate driver 30, a display panel 40, a backlight unit 50, and liquid crystal shutter glasses 60. The data driver 20 and the gate driver 30 constitute a panel driver.

The control circuit 10 separates a 3D input frame including 3D data into a left-eye data frame L and a right-eye data frame R and doubles the left-eye data frame L and the right-eye data frame R, resulting in doubled data frames including original left-eye data frame L, copied left-eye data frame L, original right-eye data frame R, and copied right-eye data frame R. The copied data frames are identical to the original data frames. In addition, the control circuit 10 ODC-modulates the doubled data frames LLRR to generate ODC-modulated frames L'L"R'R", and then substitutes the ODC-modulated copied data frames L"R" with black frames B to generate final modulated frames L'BR'B. Furthermore, the control circuit 10 controls the data polarities of the final modulated frames L'BR'B according to a 4-frame inversion method.

To achieve this, the control circuit 10 includes a data separator 11, a data doubling unit 12, a frame memory 13, a data modulator 14, a look-up table (LUT) 15, a selector 16, and a timing controller 17.

The data separator 11 separates a 3D input frame inputted from an external video source into a left-eye data frame L and a right-eye data frame R. In addition, the data separator 11 multiplies an input frame frequency (for example, 60 Hz) by two and synchronizes display timings of the left-eye data frame L and the right-eye data frame R with the multiplied frame frequency (for example, 120 Hz).

The data doubling unit 12 doubles the left-eye data frame L and the right-eye data frame R inputted from the data separator 11 through a data copying operation using a memory (not shown). The data doubling unit 12 further multiplies the multiplied frame frequency (for example, 120 Hz) by two and synchronizes display timings of the doubled data frames LLRR with the further multiplied frame frequency (for example, 240 Hz). The doubled data frames LLRR include the original left-eye data frame L, a copied left-eye data frame L, the original right-eye data frame R, and a copied right-eye data frame R. The data doubling unit 12 generates a flag bit as a first logic in synchronization with the display timings of the original data frames and generates the flag bit as a second logic in synchronization with the display timings of the copied data frames.

The frame memory 13 stores the doubled data frames LLRR inputted from the data doubling unit 12 by one frame period.

The look-up table 15 stores compensation values selected through comparison of data of an nth frame Fn (that is, the current frame) and data of an (n−1)th frame Fn−1 (that is, a previous frame). The compensation values of the look-up table 15 are previously determined through experiments to improve the response characteristic of liquid crystal and remove a luminance variation. The compensation values of the look-up table 15 are loaded from an external EEPROM whenever power is supplied to the 3D image display device. The compensation values stored in the EEPROM may be updated by a user.

The data modulator 14 receives the data of the current frame Fn from the data doubling unit 12 and receives the data of the previous frame Fn−1 from the frame memory 13. The data modulator 14 compares the data of the previous frame Fn−1 with the data of the current frame Fn, detects a data variation according to the comparison result, reads a compensation value (ODC value) corresponding to the detection result from the look-up table 15, and modulates the data of the current frame Fn with the read compensation value. The original left-eye data frame L is modulated to a first modulated left-eye data frame L' based on the copied right-eye data frame R arranged prior to the original left-eye data frame L, and the copied left-eye data frame L is modulated to a second modulated left-eye data frame L" based on the original left-eye data frame L arranged prior to the copied left-eye data frame L, according to the ODC modulation. In addition, the original right-eye data frame R is modulated to a first modulated right-eye data frame R' based on the copied left-eye data frame L arranged prior to the original right-eye data frame R, and the copied right-eye data frame R is modulated to a second modulated right-eye data frame R" based on the original right-eye data frame R arranged prior to the copied right-eye data frame R, according to the ODC modulation.

The selector 16 substitutes the copied data frames ODC-modulated in the data modulator 14 with black frames B based on the flag bit inputted from the doubling unit 12. Specifically, the selector 16 selects the original data frames ODC-modulated in the data modulator 14, that is, the first modulated left-eye data frame L' and the first modulated right-eye data frame R1, according to the first logic of the flag bit and substitutes the copied data frames ODC-modulated in the data modulator 14, that is, the second modulated left-eye data frame L" and the second modulated right-eye data frame R", with black frames B according to the second logic of the flag bit, to generate final modulated frames L'BR'B. Finally, the selector 16 outputs the final modulated frames L'BR'B to the data driver 20.

The timing controller 17 generates timing control signals DDC and GDC for controlling the operation timings of the data driver 20 and the gate driver 30 based on timing signals (a vertical synchronization signal Vsync, a horizontal synchronization signal Hsync, a data enable signal DE, a dot clock signal DCLK, etc.) inputted from external devices. The data timing control signal DDC includes a source start pulse (SSP) signal, a source shift clock (SSC) signal, a source output enable (SOE) signal, a polarity control signal, etc. The gate timing control signal GDC includes a gate start pulse (GSP) signal, a gate shift clock (GSC) signal, a gate output enable (GOE) signal, etc. The timing controller 17 may multiply the data timing control signal DDC and the gate timing control signal GDC such that the data timing control signal DDC and the gate timing control signal GDC are synchronized with a multiplied frame frequency (for example, 240 Hz). The timing controller 17 generates a light source control signal CBL for controlling the on/off timing of the backlight unit 50 based on the multiplied frame frequency. The timing controller 17 generates a shutter control signal CST for controlling the opening/shutting timing of the liquid crystal shutter glasses 60 based on the multiplied frame frequency.

The data driver 20 converts the 3D data of the final modulated frames L'BR'B inputted from the control circuit 10 into analog signals in response to the data timing control signal DDC. In addition, the data driver 20 inverts the polarities of the analog signals according to a 4-frame inversion method as shown in FIG. 11 and provides the analog signals with inverted polarities to data lines of the display panel 40. The polarities are inverted according to the 4-frame inversion method to remove DC image sticking. When a DC voltage is applied to an LCD for a long time, negative ions are moved in the same motion vector direction and positive ions are moved in a direction opposite to the motion vector direction according to the polarity of an electric field applied to liquid crystal to generate polarization, and the quantity of accumulated negative ions and the quantity of accumulated positive ions increase with the lapse of time. The increase in the quantities of accumulated ions degrades an alignment film to thereby deteriorate alignment characteristic of the liquid crystal. Accordingly, when a DC voltage is applied to the LCD for a long time, image sticking is generated on a displayed image and becomes serious with the lapse of time. The image sticking is rapidly generated and becomes severe as the temperature increases or a time for which a DC voltage is applied to a liquid crystal layer increases. This DC imaging sticking becomes more serious when a data polarity is inverted for every one frame or two frames while BDI is applied to the 3D image. Referring to FIG. 11, the data polarity of the left-eye data frame L' and the data polarity of the right-eye data frame R' are maintained as positive (+) so as to increase DC image sticking when a one-frame inversion method is used. Furthermore, the data polarity of the left-eye data frame L' is maintained as positive (+) and the data polarity of the right-eye data frame R' is maintained as negative (−) so as to deepen the DC image sticking when a 2-frame inversion method is employed. However, when the 4-frame inversion method is applied, as in the implementation of this document, the data polarity of the left-eye data frame L' and the data polarity of the right-eye data frame R' are inverted for every four frames, and thus the DC image sticking is remarkably decreased.

The gate driver 30 generates scan pulse signals in response to the gate timing control signal GDC and sequentially provides the scan pulse signals to gate lines of the display panel 40.

The display panel 40 includes two glass substrates and a liquid crystal layer interposed between the two glass substrates. The display panel 40 includes data lines and gate lines intersecting the data lines, formed on the lower glass substrate. Liquid crystal cells are arranged in a matrix form according to the intersecting structure of the data lines and the gate lines in the display panel 40. The display panel 40 includes a black matrix, a color filter, and a common electrode of the liquid crystal cells, formed on the upper glass substrate. The common electrode is formed on the upper glass substrate in a vertical field driving mode such as twisted nematic (TN) mode and vertical alignment (VA) mode and formed together with pixel electrodes on the lower glass substrate in a horizontal field driving mode such as in-plane switching (IPS) mode and fringe field switching (FFS) mode. Polarizers are respectively attached to the upper and lower glass substrates of the display panel 40 and an alignment film for setting a pretilt angle of liquid crystal is formed between the inner sides of the upper and lower glass substrates, which come into contact with the liquid crystal.

The back light unit 50 includes light sources turned on according to driving power supplied from a light source driver (not shown), a light guide (or diffuser), and optical sheets. The back light unit 50 may be of direct type or edge type. The light sources may include one or more than two of a hot cathode fluorescent lamp (HCFL), a cold cathode fluorescent lamp (CCFL), an external electrode fluorescent lamp (EEFL), and a light emitting diode (LED). The back light unit 50 may be omitted when the 3D image display device is a reflective mode display device.

The liquid crystal shutter glasses 60 operate in a 3D mode and include a left-eye shutter STL and a right-eye shutter STR, which are electrically individually controlled. Each of the left-eye shutter STL and the right-eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is provided with a reference voltage and the second transparent electrode is provided with ON/OFF voltage. The left-eye shutter STL and the right-eye shutter STR transmit light from the display panel 40 when the ON voltage is supplied to the second transparent electrode and block the light from the display panel 40 when the OFF voltage is applied to the second transparent electrode. The left-eye shutter STL is opened in a first period including a period for which the left-eye data frame L' is displayed on the display panel 40 and the right-eye shutter STR is opened in a second period for which the right-eye data frame R' is displayed on the display panel 40.

As described above, the 3D image display device and the driving method thereof double and ODC-modulate the left-eye and right-eye data frames before substitution of black frames such that the data of the right-eye data frames (or the left-eye data frames) is ODC-modulated with reference to the gray-scale value of the left-eye data frames (or the right-eye data frames), rather than the gray-scale value of the black frames, when the BDI method is applied to 3D image display. Accordingly, 3D crosstalk can be effectively removed without generating a luminance variation when a 3D image is displayed.

Furthermore, the 3D image display device and the driving method thereof can invert a data polarity according to the 4-frame inversion method so as to remarkably decrease DC imaging sticking when the BDI method is applied to 3D image display.

Other implementations are within the scope of the following claims.

What is claimed is:

1. A method of driving a 3D image display device, comprising:
    receiving a 3D data frame and separating the 3D data frame into a left-eye data frame and a right-eye data frame;
    doubling the left-eye data frame into the original left-eye data frame and a copied left-eye data frame and doubling the right-eye data frame into the original right-eye data frame and a copied right-eye data frame;
    ODC (over driving control) modulating the original left-eye data frame to a first modulated left-eye data frame based on the copied right-eye data frame arranged prior to the original left-eye data frame, ODC modulating the copied left-eye data frame to a second modulated left-eye data frame based on the original left-eye data frame arranged prior to the copied left-eye data frame, ODC modulating the original right-eye data frame to a first modulated right-eye data frame based on the copied left-eye data frame arranged prior to the original right-eye data frame, and ODC modulating the copied right-eye data frame to a second modulated right-eye data frame based on the original right-eye data frame arranged prior to the copied right-eye data frame;
    substituting the second modulated left-eye data frame and the second modulated right-eye data frame with black frames,
    wherein the ODC modulating includes respectively comparing each of the original left-eye data frame, the copied left-eye data frame, the original right-eye data frame, and the copied right-eye data frame with the corresponding prior data frames, detecting a data variation according to the result of each respective comparing step, and reading a compensation value corresponding to each respective data variation from a memory, and
    wherein the substituting of the second modulated left-eye data frame and the second modulated right-eye data frame with black frames is only performed after the ODC modulating of each of the original left-eye data frame, the copied left-eye data frame, the original right-eye data frame, and the copied right-eye data frame; and
    displaying data of final modulated frames consisting of the first modulated left-eye data frame, the first modulated right-eye data frame and the black frames on a display panel,
    wherein a flag bit is generated as a first logic in synchronization with the display timings of the original left-eye data frame and the original right-eye data frame, and the flag bit is generated as a second logic in synchronization with the display timings of the copied left-eye data frame and the copied right-eye data frame,
    wherein, in the substitution step, the first modulated left-eye data frame and the first modulated right-eye data frame are not substituted with black frames according to the first logic of the flag bit, and the second modulated left-eye data frame and the second modulated right-eye data frame are substituted with black frames according to the second logic of the flag bit, and
    wherein the logic of the flag bit is used in the step of substituting the second modulated left-eye data frame and the second modulated right-eye data frame with black frames after the ODC modulating of the original left-eye data frame, the copied left-eye data frame, the original right-eye data frame, and the copied right-eye data frame.

2. The method of claim 1, wherein the left-eye data frame and the right-eye data frame are doubled through a data copy operation using a memory.

3. The method of claim 1, wherein the data timings of the left-eye data frame and the right-eye data frame are synchronized with the frame frequency which are obtained by multiplying the input frame frequency of the 3D data frame by two, and the data timings of the original left-eye data frame, the copied left-eye data frame, the original right-eye data frame, and the copied right-eye data frame are synchronized with the frame frequency which are obtained by further multiplying the frame frequency of the left-eye data frame and the right-eye data frame by two.

4. The method of claim 1, wherein the ODC modulation step is performed with reference to a look-up table.

5. The method of claim 1, further comprising a step of inverting the polarities of the data of the final modulated frames according to a 4-frame inversion method before displaying them on the display panel.

6. An image display device, comprising:
    a display panel;
    a control circuit, including:
    a data separator configured to receive a 3D data frame and separate the 3D data frame into a left-eye data frame and a right-eye data frame;
    a data doubling unit configured to double the left-eye data frame into the original left-eye data frame and a copied left-eye data frame and double the right-eye data frame into the original right-eye data frame and a copied right-eye data frame;
    a data modulator configured to ODC (over driving control) modulate the original left-eye data frame to a first modulated left-eye data frame based on the copied right-eye data frame arranged prior to the original left-eye data frame, ODC modulate the copied left-eye data frame to a second modulated left-eye data frame based on the original left-eye data frame arranged prior to the copied left-eye data frame, ODC modulate the original right-eye data frame to a first modulated right-eye data frame based on the copied left-eye data frame arranged prior to the original right-eye data frame, and ODC modulate the copied right-eye data frame to a second modulated right-eye data frame based on the original right-eye data frame arranged prior to the copied right-eye data frame,
    wherein, when the data modulator ODC modulates each of the original left-eye data frame, the copied left-eye data frame, the original right-eye data frame, and the copied right-eye data frame, the data modulator is further configured to respectively compare each of the original left-eye data frame, the copied left-eye data frame, the original right-eye data frame, and the copied right-eye data frame with the corresponding prior data frames, detect a data variation according to the result of each respective comparing step, and read a compensation value corresponding to each respective data variation from a memory; and a selector configured to substitute the second modulated left-eye data frame and the second modulated right-eye data frame with black frames, so as to form final modulated frames consisting of the first modulated left-eye data frame, the first modulated right-eye data frame and the black frames, and output the final modulated frames to the display panel, wherein the selector substitutes the second modulated left-eye data frame and the second modulated right-eye data frame with black frames only after the data modulator ODC modulates each of the original left-eye data frame, the copied left-eye data frame, the original right-eye data frame, and the copied right-eye data frame, wherein the data doubling unit is further configured to generate a flag bit as a first logic in synchronization with the display timings of the original left-eye data frame and the original right-eye data frame, and generate the flag bit as a second logic in synchronization with the display timings of the copied left-eye data frame and the copied right-eye data frame, wherein the selector is further configured to not substitute the first modulated left-eye data frame and the first modulated right-eye data frame with black frames according to the first logic of the flag bit, and substitute the second modulated left-eye data frame and the second modulated right-eye data frame with black frames according to the second logic of the flag bit, and wherein the selector is further configured use the flag bit to substitute the second modulated left-eye data frame and the second modulated right-eye data frame with black frames after the data modulator ODC modulates the original left-eye data frame, the copied left-eye data frame, the original right-eye data frame, and the copied right-eye data frame.

7. The image display device of claim 6, wherein the data doubling unit is further configured to double the left-eye data frame and the right-eye data frame through a data copy operation using a memory.

8. The image display device of claim 6, wherein the data separator is further configured to multiply the input frame frequency of 3D data frame by two and synchronize display timings of left-eye data frame and the right-eye data frame with the multiplied frame frequency, and the data doubling unit is further configured to multiply the multiplied frame frequency by two and synchronized display timings of the original left-eye data frame, the copied left-eye data frame, the original right-eye data frame, and the copied right-eye data frame with the further multiplied frame frequency.

9. The image display device of claim 6, further comprising a frame memory is further configured to store the original left-eye data frame, the copied left-eye data frame, the original right-eye data frame, and the copied right-eye data frame input from the data doubling unit by one frame period.

10. The image display device of claim 6, further comprising a look-up table configured to store compensation values selected through comparison of data of a current frame and a previous frame, the previous frame and the current frame being frames among the original left-eye data frame, the copied left-eye data frame, the original right-eye data frame, and the copied right-eye data frame.

11. The image display device of claim 6, further comprising a panel driver including a data driver and a gate driver, configured to drive the display panel.

12. The image display device of claim 11, wherein the data driver is further configured to invert the polarities of the data of the final modulated frames according to a 4-frame inversion method.

* * * * *